United States Patent [19]

Nukui et al.

[11] Patent Number: 5,844,228

[45] Date of Patent: Dec. 1, 1998

[54] DATA SYMBOL READER INCLUDING ADJUSTABLE TRIGGER SWITCH UNIT

[75] Inventors: Makoto Nukui; Shuzo Seo; Takeharu Shin; Nobuhiro Tani; Yukihiro Ishizuka, all of Tokyo, Japan

[73] Assignee: Asahi Kogaku Kogyo Kabushiki Kaisha, Tokyo, Japan

[21] Appl. No.: 660,192

[22] Filed: Jun. 3, 1996

[30] Foreign Application Priority Data

Jun. 5, 1995 [JP] Japan .................................... 7-161461

[51] Int. Cl.⁶ ........................................................ G06K 7/10
[52] U.S. Cl. ........................................ 235/472; 200/332.2
[58] Field of Search ............................ 235/472; 200/548, 200/332.2

[56] References Cited

U.S. PATENT DOCUMENTS

| 4,286,127 | 8/1981 | Quitoschinger | 200/83 |
| 4,307,271 | 12/1981 | Carli | 200/47 |
| 4,311,885 | 1/1982 | Arthur | 200/548 |
| 4,570,208 | 2/1986 | Sassmannshausen | 362/188 |
| 4,592,144 | 6/1986 | Tolbert et al. | 200/548 |
| 4,814,565 | 3/1989 | Bingo et al. | 200/548 |
| 5,051,549 | 9/1991 | Takano | 200/16 |
| 5,051,552 | 9/1991 | Hou et al. | 200/549 |
| 5,120,922 | 6/1992 | Brouillette | 200/519 |
| 5,251,637 | 10/1993 | Shalvi | 128/735 |
| 5,251,706 | 10/1993 | Evans | 173/29 |
| 5,345,071 | 9/1994 | Dumont | 235/472 |
| 5,428,212 | 6/1995 | Tani et al. | 235/472 |
| 5,463,692 | 10/1995 | Fackler | 381/68 |
| 5,657,861 | 8/1997 | Takano et al. | 200/550 |

FOREIGN PATENT DOCUMENTS

| 0249084 | 10/1990 | Japan | 235/472 |
| 406325662 | 11/1994 | Japan | 200/548 |
| 2255650 | 11/1992 | United Kingdom . | |

OTHER PUBLICATIONS

United Kingdom Search Report.

*Primary Examiner*—Donald T. Hajec
*Assistant Examiner*—Douglas X. Rodriguez
*Attorney, Agent, or Firm*—Greenblum & Bernstein P.L.C.

[57] ABSTRACT

A casing of a data symbol reader has a grip portion and head portion. A signal processing circuit is housed in the grip portion. A light source for illumination, an image sensing device, and an optical system for imaging the symbol reading area on the light receiving surface of the image sensing device are housed in the head portion. A housing extends from the head portion towards a symbol reading area, and the symbol reading area is formed as a front opening of the housing. A trigger switch for initiating the reading operation and a trigger button for actuating the trigger switch are positioned at the side of casing. The trigger switch and trigger button are supported by a supporting structure in a manner enabling movement with respect to casing.

14 Claims, 8 Drawing Sheets

DATA SYMBOL READER INCLUDING ADJUSTABLE TRIGGER SWITCH UNIT

BACKGROUND OF THE INVENTION

The present invention relates to a data symbol reader for reading coded information such as two-dimensional data symbols.

Bar codes, and associated methods and devices for coding and reading bar code information, have come to be widely used for applications such as point-of-sale (POS) systems. However, since bar codes are in a one-dimensional format, in which the coding and reading of data are based on a one dimensional arrangement of bars, such systems are limited in terms of the amount of information that can be coded and read.

Data symbols, in which a mosaic or tessellated pattern is arranged in, for example, a black and white, two-dimensional symbol, have been developed in order to hold more information. Appropriate coding and reading devices have also been developed for such data symbols. These reading devices may be largely classified into two groups: those in which an image sensing device or an area sensor, such as a CCD, is used to read the data symbol pattern in two dimensions simultaneously; and those in which a line sensor is used to perform a main scan of each line, and the reading device and data symbol are moved relative to each other in a direction perpendicular to the main scanning direction to perform sub-scanning, thereby reading in two dimensions.

Reading devices which use an image sensing device (i.e., an area sensor) do not require relative movement between the reading unit and the data symbol for sub-scanning, and are thus able to read data symbols in a shorter time.

A conventional data symbol reader 100 is shown in FIG. 1. The data symbol reader 100 has a casing 101. The casing 100 is formed from a grip part 102, which is gripped with the hand, a head part 103, and a housing 104. The head part 103 is formed at the front end of the grip part 102 and, contains a reading unit (not shown). The reading unit includes an image sensing device, an optical system and a light source. The optical unit collects light reflected from a data symbol 38 to form an image on the light receiving surface of the image sensing device. The data symbol reader further includes a signal processing circuit (not shown) within the grip part 102 of the casing 101, for processing the image signals output from the image sensing device.

The housing 104 extends from the head part 103 towards the symbol reading area 36. The housing 104 has a rectangular front opening 105, which substantially coincides with the symbol reading area 36.

A trigger button 106, for actuating the trigger switch for starting the reading operation, is provided on the casing 101. The position of the trigger button 106 corresponds to the position of a finger on the hand of a user holding the grip part 102.

When the data symbol reader 100 is used for reading, the grip part 102 is held with the hand, and the housing 104 is moved over the reference plane.107, so that the data symbol 38 is positioned within the front opening 105 of the housing 104 (i.e., the data symbol 38 is within the symbol reading area 36). A trigger button 106 is then pressed to start the reading operation.

With the conventional data symbol reader 100, since the position of trigger button 106 is fixed with respect to the casing 101, the trigger button 106 may be in an inappropriate position depending on individual differences among users, such as differences in the size of the hand, the length of the fingers, the position at which the grip part 102 is gripped. The data symbol reader 100 may therefore be difficult to operate.

SUMMARY OF THE INVENTION

It is therefore an object of the present invention to provide an improved data symbol reader in which the operability of the operating member of the trigger switch is improved.

The present invention is directed to a device that satisfies this need. According to one aspect of the present invention, a data symbol reader includes a reading unit including an image sensing device and an optical system for forming an image of a data symbol on the the image sensing device; a casing for housing the reading unit; a trigger switch unit integrally including a trigger switch, for actuating the reading unit, and an operating member, for actuating the trigger switch; and a supporting structure for supporting the trigger switch unit. The supporting structure includes a position adjusting device for adjusting a position of the trigger switch unit with respect to the casing.

Accordingly, the trigger switch unit, including the operating member and the trigger switch, may be repositioned with respect to the casing, allowing an operator to position the operating member in a comfortable position. In this manner, the data symbol reader is adjustable for the particular preference of a wide range of users.

Preferably, the supporting structure movably supports the trigger switch unit, and the position adjusting device includes a guide device for restricting the direction of movement of the trigger switch unit, thus allowing the stable positioning of the operating member.

According to one particular development of this aspect of the invention, the data symbol reader includes a setting device for setting a position of the operating member with respect to the casing in a stepwise manner. The setting device secures the position of the operating member such that the operating member does not become dislodged in the adjusting direction during operation.

In another particular development of this aspect of the invention, the trigger switch unit has an engaging concave depression formed therein for movement of the trigger switch unit. In still another particular development of this aspect of the invention, the data symbol reader further includes a dustproofing device for preventing the entry of dust into the casing is provided at the periphery of the trigger switch unit.

According to another aspect of the invention, a data symbol reader includes a data symbol reading device; a casing enclosing the data symbol reading device; a longitudinal slot formed in the casing; a guide parallel to the longitudinal slot; and an operation member for actuating the data symbol reading device, the operation member being movable within the longitudinal slot along the guide.

The operation member is actuatable to start the reading of a data symbol, but is also movable along the longitudinal direction of the slot to be positioned for the preference of various users, improving the operability of the data symbol reader.

Preferably, the data symbol reader includes a positioning device for setting a position of the operation member along the longitudinal slot. The positioning device. preferably includes a detent mechanism for defining stepwise positions of the operation member along the longitudinal slot. The positions of the operation member are therefore easily and accurately settable. One particular mechanism allowing this is a detent mechanism including V-shaped teeth formed in the casing parallel to the longitudinal slot and a resilient member having an angular protrusion for engaging the V-shaped teeth, the resilient member being movable with the operation member.

Preferably, the operation member is supported by a base movable along the longitudinal slot and larger than the longitudinal slot, and the base closing entry to the casing via the longitudinal slot at all positions of the base along the longitudinal slot. Accordingly, dust, dirt, or other foreign material is prevented from entering the interior of the casing by the base at any position of the base along the longitudinal slot.

Further preferably, the operation member actuates a switch electrically connected to the data symbol reading means, the switch being provided along the longitudinal slot. In this case, the operation member and the switch may be supported by a base movable along the longitudinal slot, and the operation member and the switch are movable together along the longitudinal slot.

DETAILED DESCRIPTION OF THE PREFERRED EMBODIMENTS

Figure 1:
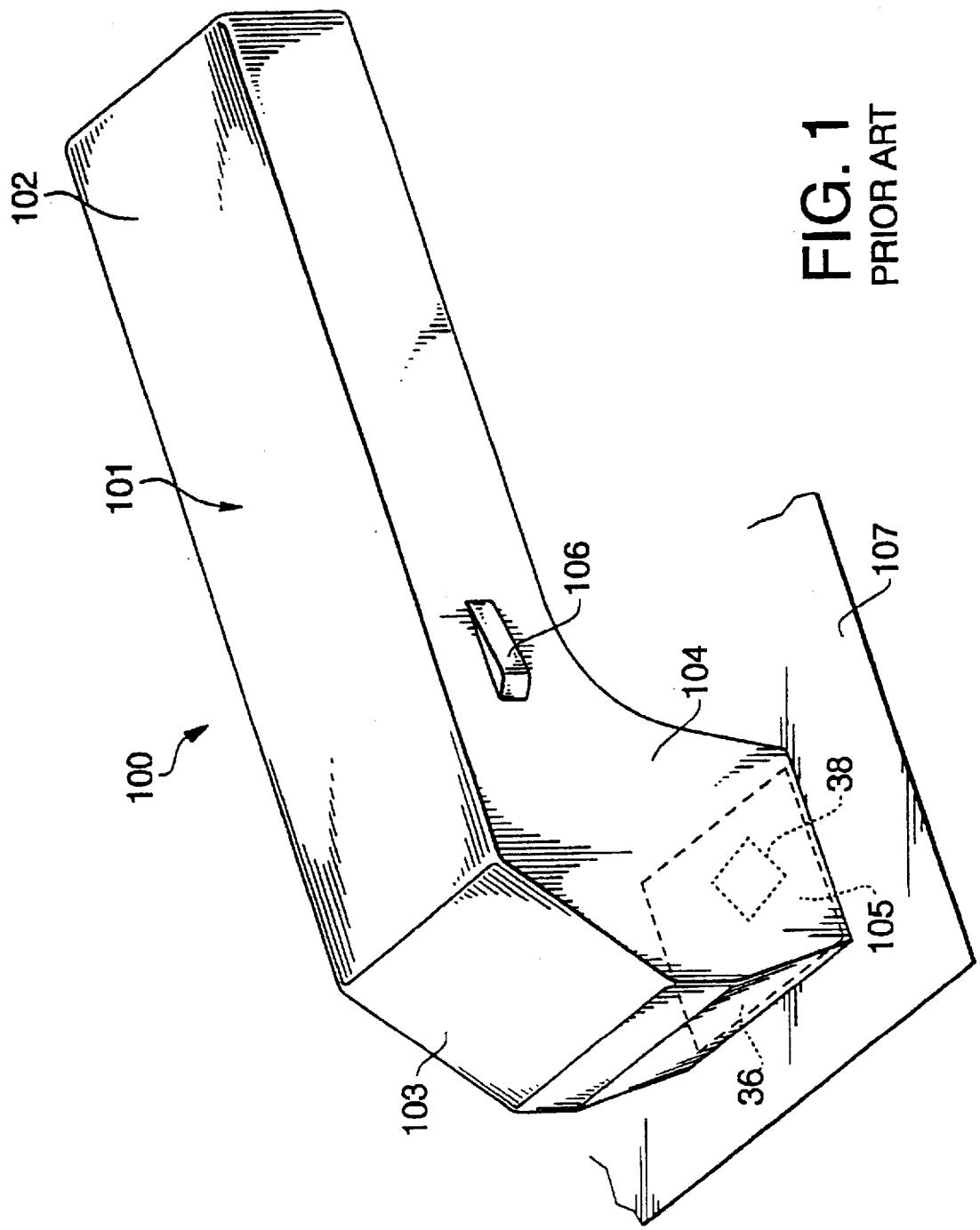
FIG. 1 is a perspective view which shows the arrangement of a conventional data symbol reader.
Figure 2:
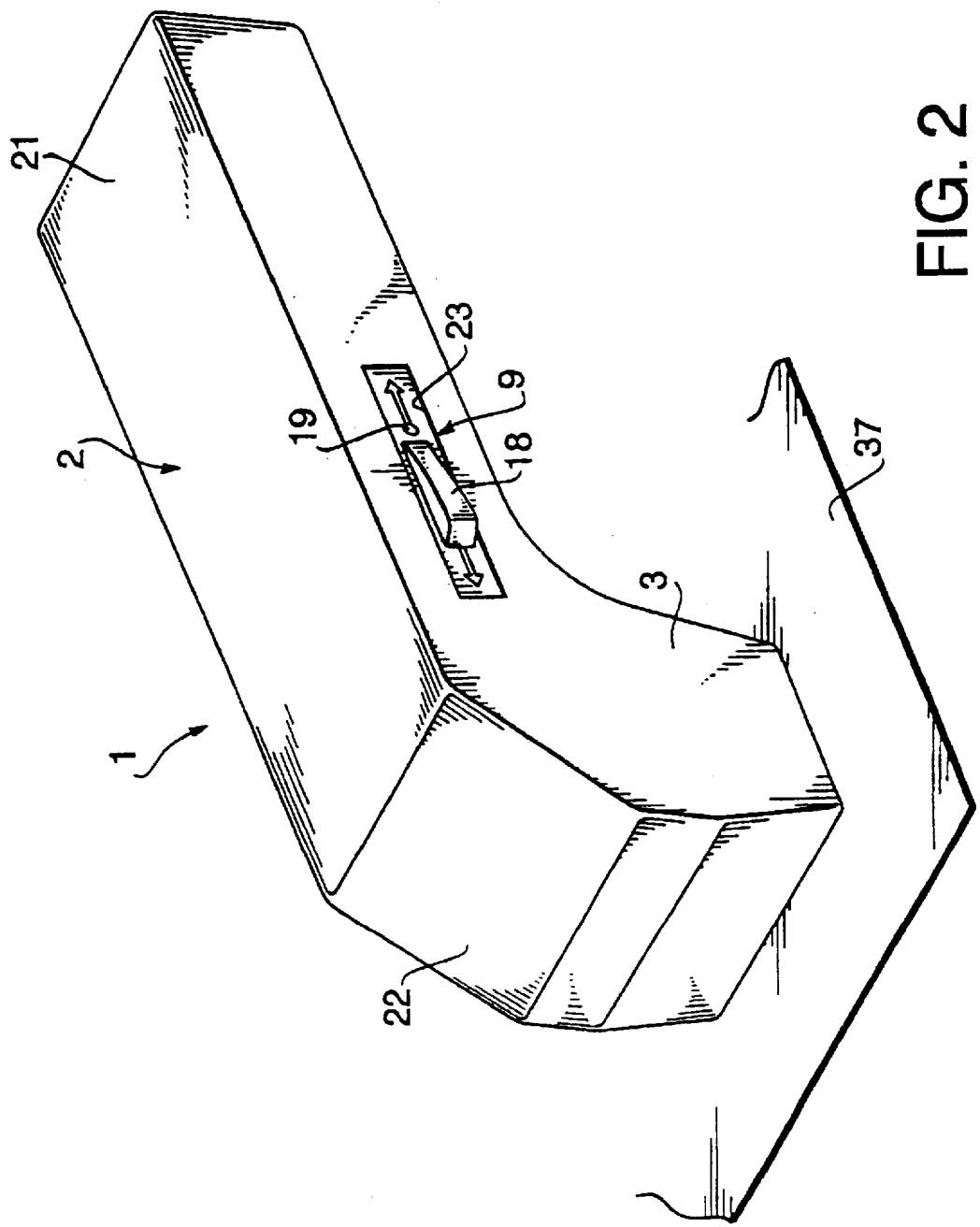
FIG. 2 is a perspective view of an embodiment of the data symbol reader according to the invention.
Figure 3:
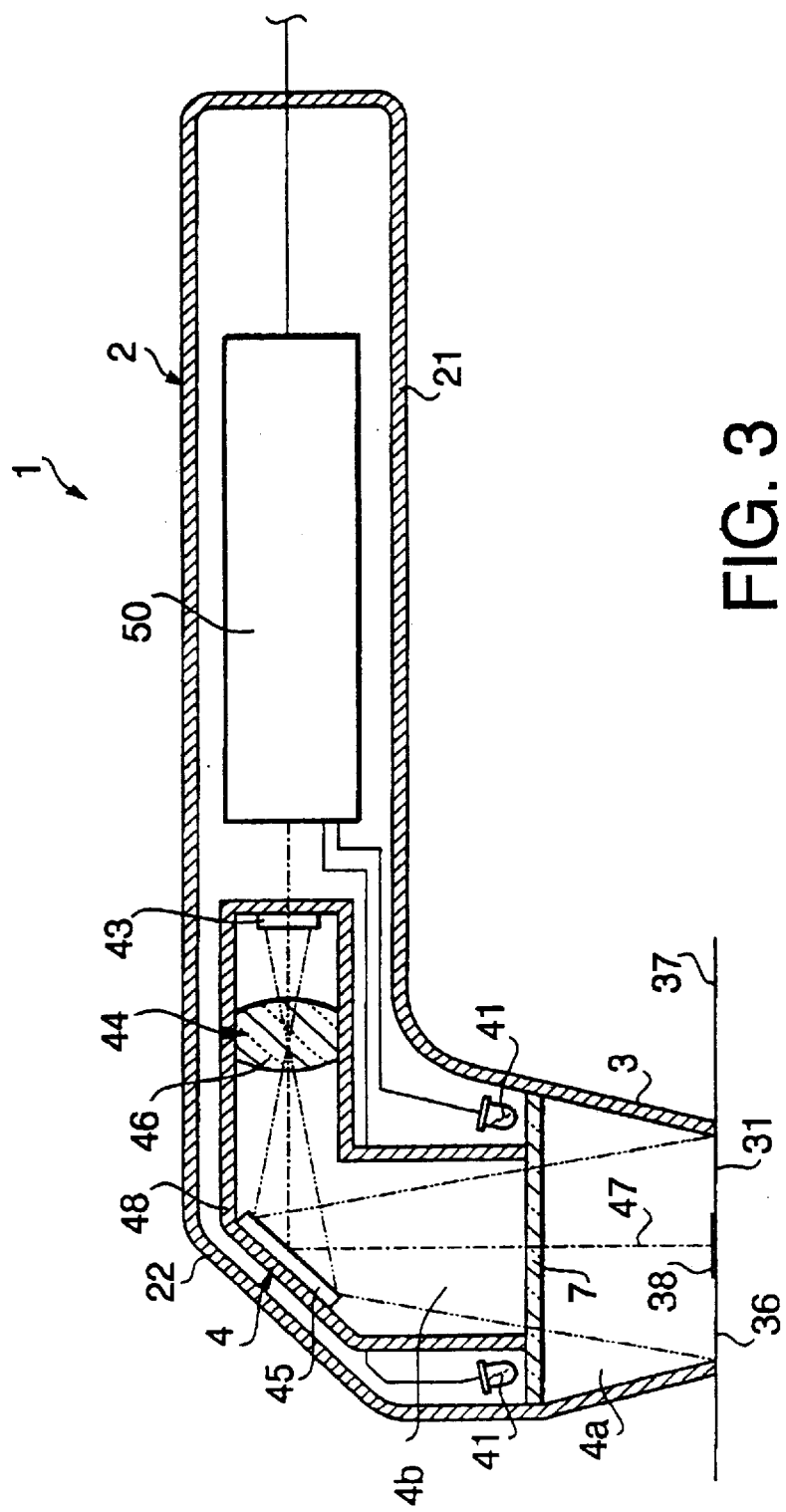
FIG. 3 is a sectional side view of the data symbol reader of FIG. 2.
Figure 4:
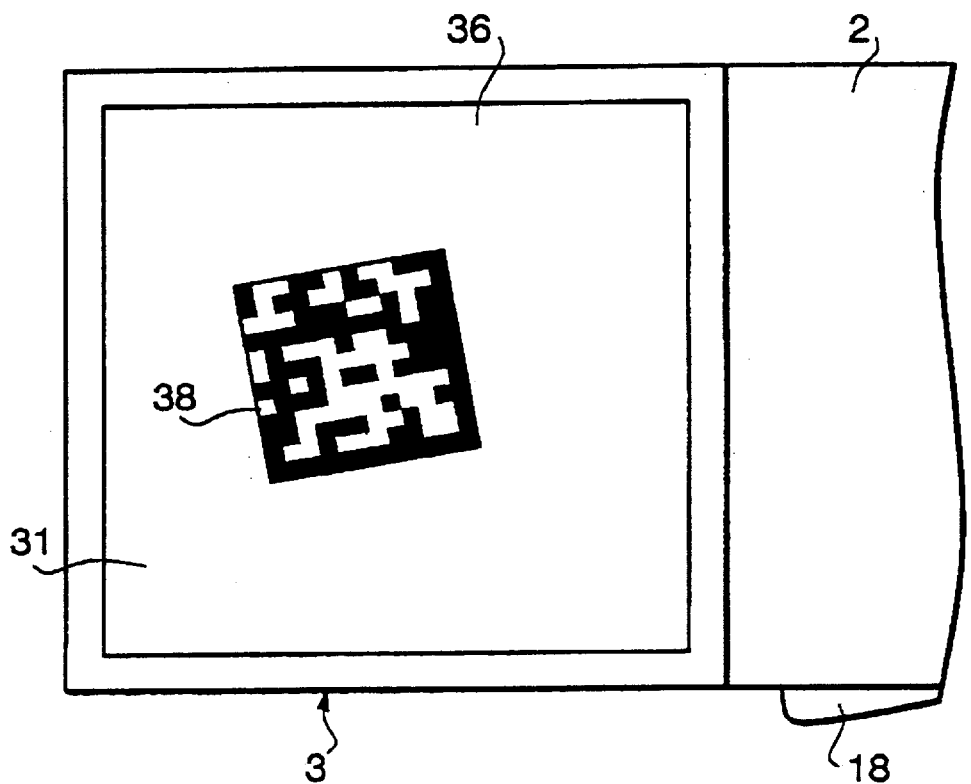
FIG. 4 is a bottom view of a housing of the data symbol reader of in FIG. 2.
Figure 5:
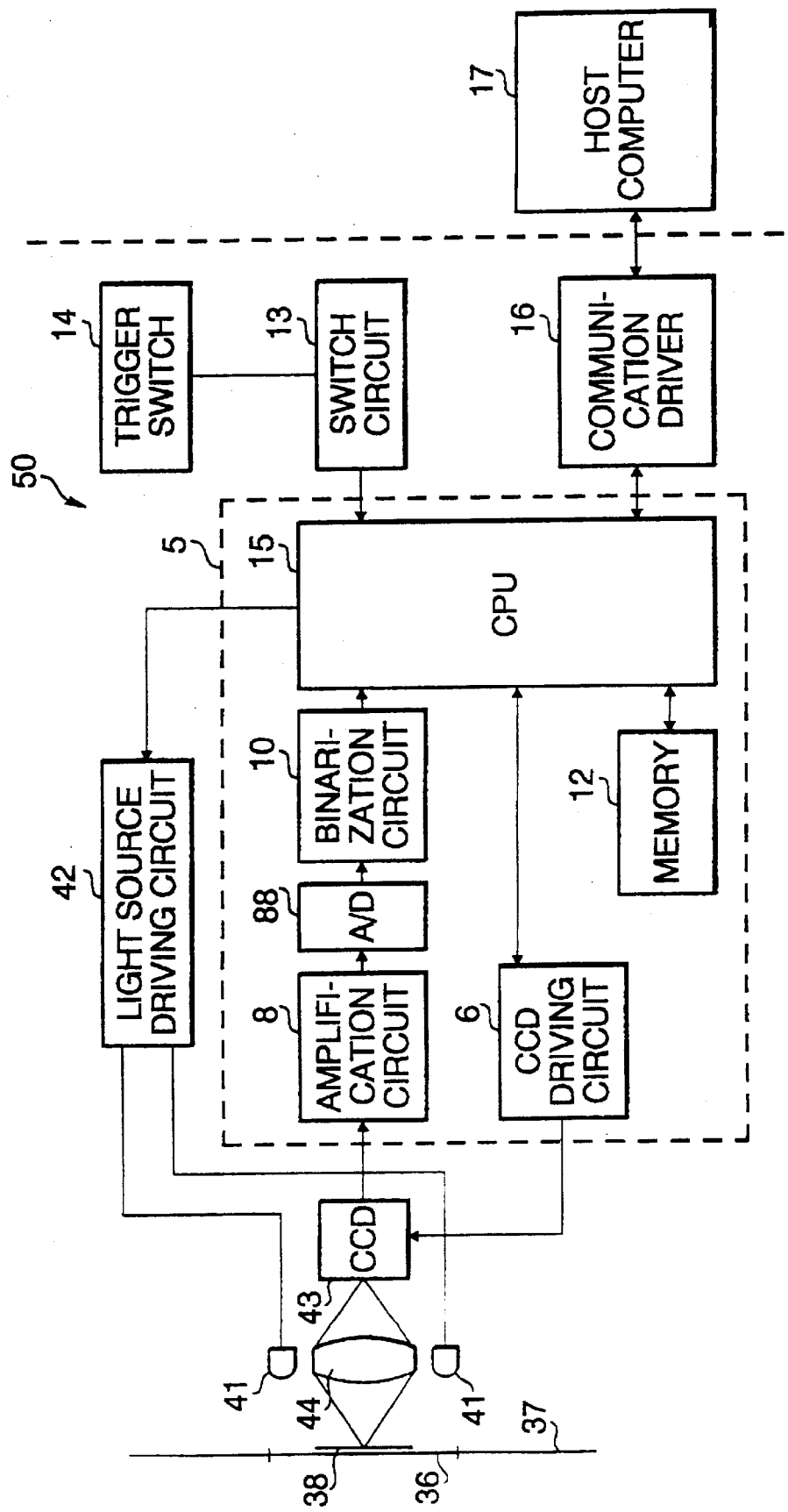
FIG. 5 is a block diagram showing a control circuit of the data symbol reader shown in FIG. 2.

FIG. 2 is a perspective view of an embodiment of a data symbol reader according to the invention, FIG. 3 is a sectional side view of the data symbol reader shown in FIG. 2, FIG. 4 is a bottom view of the housing of the data symbol reader shown in FIG. 2, and Fig. 5 is a block diagram of the circuit arrangement of the data symbol reader shown in FIG. 2.

With reference to FIGS. 2 through 5, the data symbol reader 1 according to the invention has a casing 2 including a grip part 21 and a head part 22. The head part 22 is formed at the end of the grip part 21. The casing 2 houses a reading unit 4, and a control circuit 50. As shown in FIG. 5, the control circuit 50 includes a signal processing circuit 5, a light source driving circuit 42, and a communication driver 16.

The reading unit 4 includes two light sources 41, 41, a charge coupled device (CCD) 43 as an image sensing device, an optical system 44, and a supporting member 48. The optical system 44 guides light from the symbol reading area 36 to form an image on the light receiving surface of the CCD 43. In the present embodiment, the light is reflected from the surface of the data symbol 36. The optical system 44 includes a mirror 45 and a lens group 46. The mirror 45 bends the path of the reflected light 47 from the symbol reading area 36 at nearly a right angle. The lens (or lens group) 46, causes the light reflected by the mirror 45 to form an image on the light receiving surface of the CCD 43.

The two light sources 41 illuminate the symbol reading area 36, and are set in a substantially symmetrical manner with respect to the light path 47. A light emitting element such as an LED, a halogen lamp, a semiconductor laser, or the like can be used as the light source 41. A diffuser plate (not shown) with a rough or translucent surface may be installed at the light emitting side of light source 41, in order to make the luminance at the symbol reading area 36 more uniform. The diffuser plate can alternatively be formed by roughening a surface of a transparent plate 7 (described later). The light sources 41 are connected to and are controlled by a light source driving circuit 42 in the control circuit 50.

The CCD 43 has many photodiode light receiving (or picture) elements disposed in an array. Each of the picture elements accumulates an electrical charge corresponding to the amount of light received, and sequentially transfers the charge at a predetermined time. The transferred charges are readable (analog) image signals.

The symbol reading area 36 is formed on a reference plane 37, representing the surface upon which the data symbol 38 is positioned. The symbol reading area 36 is a predetermined area illuminated by the light source 41. The light reflected from the symbol reading area 36 is sent to the CCD 43. The symbol reading area 36 substantially coincides with or includes the front opening 31 of the housing 3. (described later), and is included in the effective sensing area of the CCD 43.

As shown in FIG. 3, the data symbol 38 consists of a tessellated pattern of black and white cells (alternatively, black and transparent cells) which are arranged in an array. The array has no less than 2 columns (i.e., x columns, where X>1) and rows (i.e., y rows, where y>1) of cells. In this way, each cell can express 0 or 1 in a binary system and information can be specified by a combination of these cells. However, the data symbol 38 readable by the data symbol reader is not restricted to the illustrated arrangement.

The head part 22 of the casing 2 includes a housing 3 extending from the position of the reading unit 4 to the symbol reading area 36. The housing 3 has a rectangular opening 31 opposing the reading unit 4. The housing 3 substantially surrounds both the light path of the illuminating light from the light sources 41, and the light path 47 of the light reflected from the symbol reading area 36. In this embodiment, the housing 3 is rectangular in a cross section parallel to the plane of the symbol reading area 36. The housing 3 maintains the reading unit 4 at a predetermined distance (i.e., a predetermined optical path length) from the symbol reading area 36. The housing 3 length is set to maintain the reading unit 4 at the predetermined distance such that when the front end of the housing 3 comes in contact with the reference plane 37, the light from the symbol reading area 36 will pass through the optical system 44 and form an image on the light receiving surface of the CCD 43.

A transparent plate 7 is installed substantially normal to the light path 47 in the interior of the housing 3 at the inner side of the front opening 31. The transparent plate 7 prevents debris, dirt, and moisture from entering the reading unit 4 and the interior of the casing 2. The transparent plate 7 is installed at a position near the end of the supporting member 48, and partitions the internal space of the housing 3 into a reading unit side space 4a and a front opening side space 4b. The transparent plate 7 can be formed from glass or plastic, and as described above, the transparent plate 7 may alternatively be used as a diffuser for the light sources 41, instead of a separate diffuser plate as described.

The control circuit 50 of the data symbol reader 1 includes a signal processing circuit 5 for processing the image signals received from the reading unit 4. As shown in FIG. 5, the signal processing circuit 5 includes a CCD driving circuit 6, an amplification circuit 8, a binarization circuit 10, a memory 12, and a central processing unit (CPU) 15 as a control means.

The CPU 15 is further connected to the light source driving circuit 42, the communication driver 16, and a switch circuit 13 (for the trigger switch 14). The power for the device can be supplied, for example, from a host computer. Furthermore, an indication device (not shown), such as a light emitting diode (LED), a liquid crystal display (LCD), or a cathode ray tube (CRT), may also be connected as necessary to the CPU 15.

A reading operation initiated when the trigger switch 14 is turned ON by the pressing of the trigger button 18 (with the power ON). Signal processing is then performed by the signal processing circuit 5. The signals processed by signal processing circuit 5 are decoded into the necessary data, and input by the communication driver 16 into an externally installed host computer 17, which may, for example, be a personal computer or a work station. The storage and tabulation of the input data are performed at the host computer 17.

The CPU 15 controls the light source driving circuit 42 at appropriate times to supply power to the. light sources 41, for example, when the trigger switch 14 is turned ON. In this embodiment, the lighting duration of the light sources 41 is set to a predetermined time by the light source driving circuit 42 or the CPU 15.

The CPU 15 further activates the CCD driving circuit 6 when the trigger switch 14 is turned ON. A horizontal CCD driving pulse and a vertical CCD driving pulse are output from the CCD driving circuit 6 to the CCD 43 to control the accumulation and transfer of charge at the CCD 43.

Clock signals are also generated at the CCD driving circuit 6. For example, composite clock signals, having a horizontal synchronization signal and a vertical synchronization signal combined with a clock signal, are transmitted from the CCD driving circuit 6 to the CPU 15.

The amplification circuit 8 is connected to the CCD 43, and amplifies the (analog) image signals from the CCD 43. The analog image signals are converted into digital image signals (for example, 8-bit image signals) by an A/D converter 88 and then input into the binarization circuit 10.

In the binarization circuit 10, the digital image signals from each picture element are turned into a binary value of "1" or "0" according to predetermined threshold data. A binarized data value of "1", corresponds to a black part of the data symbol 38 while a value of "0" corresponds to a white part. The binarized data output from the binarization circuit 10 are transferred through the CPU 15 and stored in prescribed addresses in the memory 12 by means of an address counter included in the CPU 15. This address counter is driven according to the composite clock signals input from the CCD driving circuit 6.

In operation, the light source driving circuit 42 activates the two light sources 41 to illuminate the symbol reading area 36. Reflected light from the symbol reading area passes through the optical system 44, forming an image on the light receiving surface of the CCD 43. The CCD 43 then outputs image signals (analog signals) corresponding to the amount of light received, which are amplified, binarized, read by the CPU 15, and stored in the memory 12.

The data in the memory 12 are read out sequentially in accordance with the addresses designated by the abovementioned address counter. The order of readout the reverse of the order of storage into memory 12. The necessary image processing (for example, image inversion, outline extraction (extraction of only the information concerned with data symbol 38), dropout correction, and rotation, among other processing) is then performed on the data for one image in the CPU 15. The data are further decoded into data in accordance with the data symbol 38 format by means of a decoder built into the CPU 15. The decoded data are then outputted via the communication driver 16 to the computer 17.

Trigger Switch Unit

Figure 6:
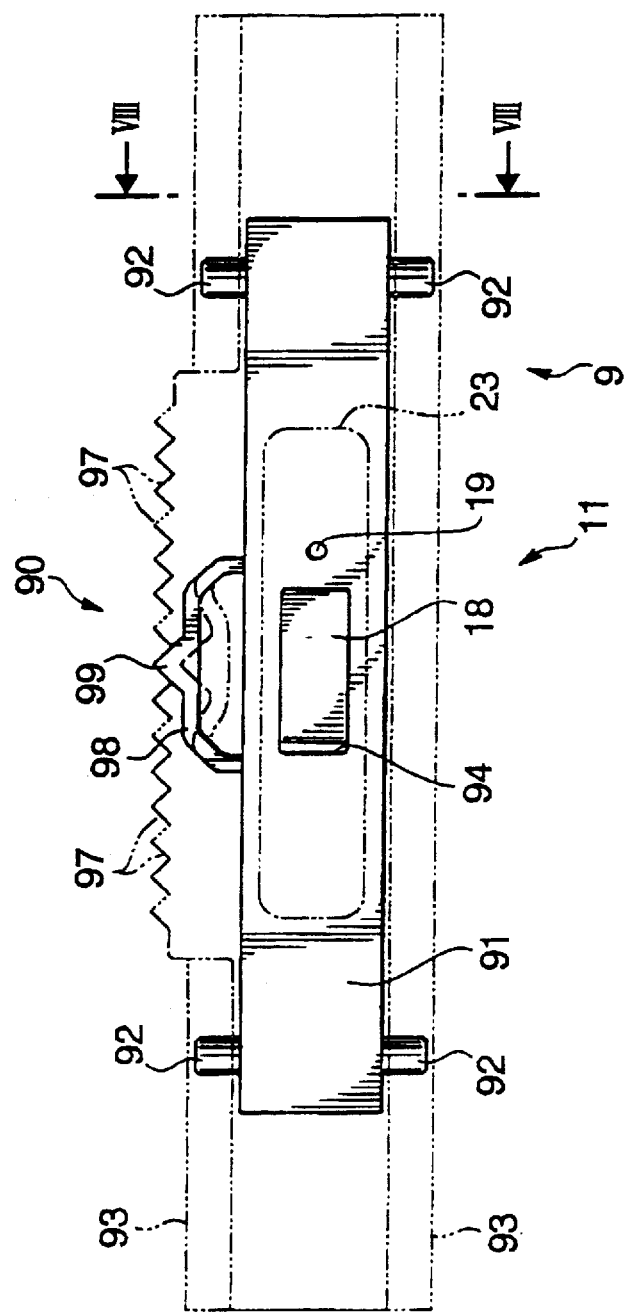
FIG. 6 is a plan view showing the arrangement of the trigger switch unit and the supporting structure thereof in the data symbol reader of FIG. 2.
Figure 7:
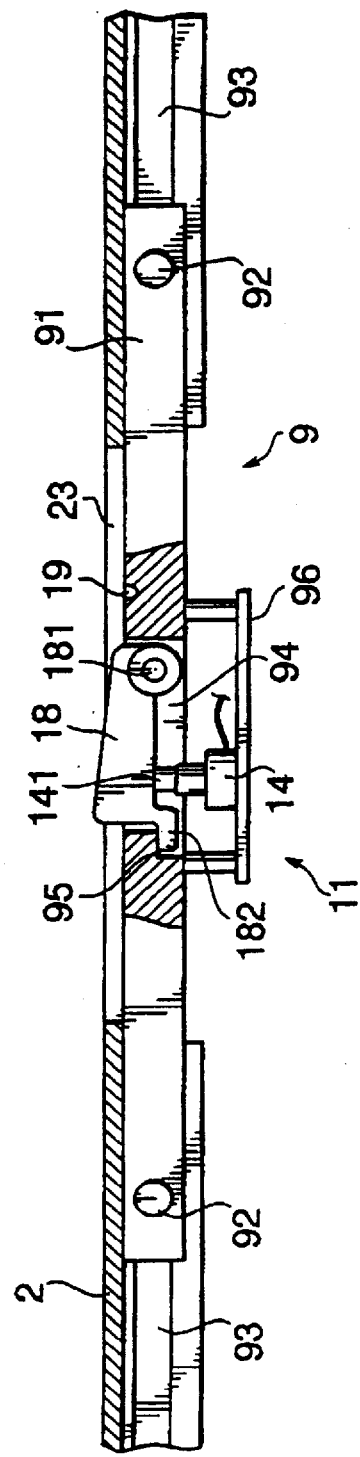
FIG. 7 is a partly cross-sectioned side view of the trigger switch unit and the supporting structure thereof shown in FIG. 6.
Figure 8:
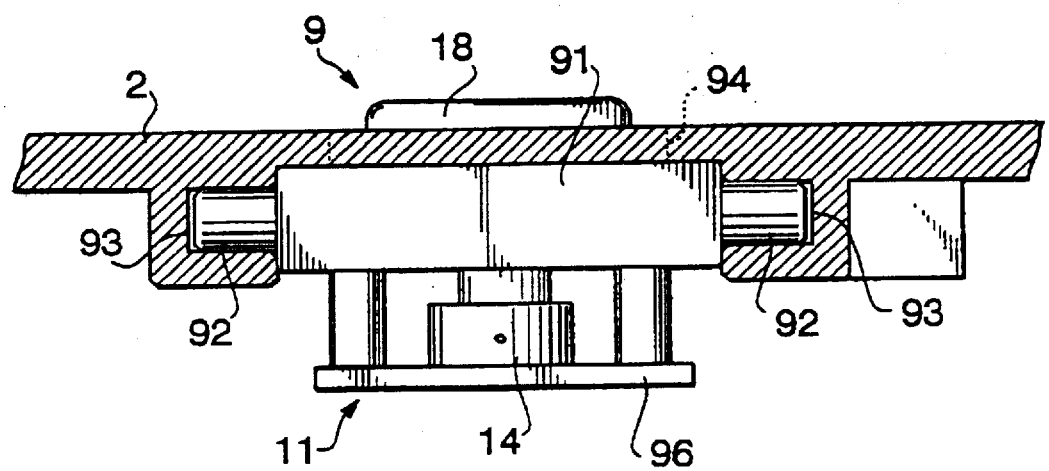
FIG. 8 is a cross section along line VIII—VIII in FIG. 6.

FIG. 6 is a plan view, and FIG. 7 is a partly sectioned side view, of a trigger switch unit 11 and a supporting structure 9 thereof in data symbol reader 1. FIG. 8 is a cross section along line VIII—VIII of FIG. 6.

A trigger switch unit 11 is installed to one of the sides of the casing 2. The trigger switch unit 11 includes a trigger switch 14 for starting the reading operation by the reading unit 4, and a trigger button (operating member) 18 for actuating the trigger switch 14.

The installed position of trigger switch unit 11 with respect to casing 2 can be changed using the supporting structure 9. The supporting structure 9 includes a strip-like base 91, four protrusions 92 that respectively protrude from both sides of the base 91 at both ends, and guide grooves 93 formed at positions of casing 2 that face the sides of the base 91 (and into which the protrusions 92 are inserted). The protrusions 92 and guide grooves 93 constitute a guide means for restricting the direction of movement of trigger switch unit 11.

An opening 94 passing through the base 91 is formed substantially at the center of base 91. The trigger button 18 is swingably supported about a shaft 181 in the opening 94. As shown in FIGS. 6 and 7, the trigger switch 14 is fixed by a supporting member 96 to the lower side of the base 91 (corresponding to the position of opening 94).

The trigger switch 14 includes a projection 141, which is biased toward the trigger button 18 by a built-in spring (not shown). In the condition of the protection 141 shown in FIG. 7 the contacts of the switch 14 are separated from each other, and the switch 14 is therefore OFF. When the trigger button 18 is pressed, the trigger button 18 swings about shaft 181 and presses the projection 141. The projection 141 is thereby pressed against the biasing force of the built-in spring, and the contacts of the switch 14 are closed, turning the switch 14 ON and causing a trigger signal to be output from switch circuit 13.

The trigger button 18 includes an engaging piece 182 at the end opposite the shaft 181. The engaging piece 182 engages with a step 95 formed at the edge of opening 94. Accordingly, the engaging piece 182 restricts the maximum amount of protrusion of the trigger button 18 from opening 94.

A slot 23 is formed on the side face of the casing 2 extending in the direction of the adjusting movement of trigger switch unit 11. The trigger button 18 protrudes into the slot 23. Guide grooves 93, also extending in the direction of the adjusting movement of trigger switch unit 11, are formed at both sides of casing 2 sandwiching the slot 23. The protrusions 92 (protruding from both sides of the base 91) are inserted into and slide along the guide grooves 93. The trigger switch unit 11, along with the base 91, are thereby movable in the length direction of the base 91 engabling the adjustment of the position of the trigger button 18 within the slot 23. Alternatively, rotatable rollers may be used in place of the protrusions 92. The trigger switch unit 11 is adjusted within the slot 23 by placing a finger on trigger button 18 (exposed from slot 23) and pressing in the desired direction.

An engaging concave depression 19 is formed in the base 91 near the trigger button 18. When the trigger switch unit 11 is to be moved along the slot, a pin (or, for example, the tip of a ball-point pen) is inserted in the engaging concave depression 19, and the trigger switch unit is moved by virtue of the positive engagement between the pin and the engaging concave depression 19. That is, in cases where it is difficult to move trigger switch unit 11 by pressing the trigger button 18 in the adjusting direction, a pin is inserted into the engaging concave depression 19, and moved in the desired direction to adjust the position of trigger switch unit 11.

Since the engaging concave depression 19 is concave, it does not interfere with the operation of the trigger button 18 even if positioned near trigger button 18.

The base 91 is formed with a length and width with respect to slot 23 so that the base 91 always covers the slot 23 and protects the inside of casing 2, no matter where trigger switch unit 11 is positioned within its range of movement. Accordingly, the entry of dust, lint, and other foreign matter (into the casing 2 via the slot 23) is prevented, and the base 91 constitutes a dustproofing means.

The data symbol reader 1 includes a positioning device 90 for setting the position of the. trigger switch unit 11 with respect to the casing 2 in a stepwise manner. As shown in FIG. 6, the positioning device 90 is a clicking mechanism including a plurality of V-shaped grooves 97 formed in the case 2 and arranged along the direction of movement of trigger switch unit 11, and a resilient member 98, formed on one side of the base 91. The resilient member 98 has an angular protrusion 99 which selectively fits into the grooves 97.

When the trigger switch unit 11 is moved in the adjusting direction, the protrusion 99 (fitted into one of the grooves 97) slides up the incline of the current groove 97, passes over the boundary (peak) to the adjacent groove 97, and fits into the adjacent groove 97. During this process, the resilient member 98 deforms (as shown by the double-dashed line in FIG. 6) to follow the peak of the V-shaped grooves. If the trigger switch unit 11 is moved further, the protrusion 99 fits into the successive grooves 97 in the direction of movement. The position of the trigger button 18 can be set (finely adjusted) in a stepwise fashion by means of the positioning device 90, facilitating more appropriate positioning and stability.

The force by which the protrusion 99 fits into the successive grooves 97 is controlled by the resilience of resilient member 98, so that the trigger switch unit 11 will not move too easily, even when a force in the adjusting direction acts on the trigger switch 11 when the trigger button 18 is pressed to turn ON the trigger switch 14. That is, the position of trigger button 18 will be maintained in a locked condition as long as the ordinary operation of the button 18 (i.e., for reading) is performed. Accordingly, the pressing operation of trigger button 18 does not dislodge the trigger switch unit 11 in the adjusting direction.

Although the supporting structure 9 is arranged to move along with the trigger switch unit 11 in the above embodiment, the invention is not limited to such and an arrangement. For example, an embodiment in which only the installed position of the trigger button (i.e., the operating member) is moved is also possible. In this case, a plurality of the trigger switches may be disposed along the locus of movement of the trigger button, ,so that a different trigger switch will be actuated according to the position of the trigger button. The trigger switch may also be used for a purpose other than the generation of a trigger signal (for example, the initialization of the various components of the device).

Furthermore, for example, the transverse cross-sectional shape of the housing 3 does not have to be a rectangular shape as illustrated, and may be a polygonal shape (such as a triangular, hexagonal, or octagonal shape) a circular shape, an elliptical shape, or any other shape. Still further, an opening or transparent window may formed on one or more sides of the housing 3 to enable the position of the data symbol to be checked through this opening or window. The positioning of the data symbol within the symbol reading area 36, which is to be performed in the reading process, may thus be facilitated and performed without fail.

The reading unit 4 may also be set so that ambient light is used to illuminate the symbol reading area 36. In this case, the light sources 41 may be omitted, or the light sources 41 may be used to compensate when ambient light is insufficient.

As described, the embodiment of a data symbol reader according to the invention, by providing an adjustable installed position of the operating member for actuating the trigger switch, allows the setting of the operating member at a position optimal for operability for any operator. The position of the operating member can also be adjusted easily and rapidly. Furthermore, since a dustproofing device is provided by the arrangement of the base 91 and slot 23, the entry of dust, lint, and other foreign matter into the casing is prevented, improving the reliability and reading accuracy of the device.

The present disclosure relates to subject matter contained in Japanese Patent Application No. HEI 07-161461, filed on Jun. 5, 1995, which is expressly incorporated herein by reference in its entirety.

What is claimed is:

1. A data symbol reader, comprising:
    a reading unit, said reading unit including an image sensing device and an optical system for forming an image of a data symbol on the image sensing device;
    a casing for housing said reading unit;
    a trigger switch unit integrally including a trigger switch, for actuating said reading unit, and an operating member, for actuating said trigger switch; and
    a supporting structure for supporting said trigger switch unit, said supporting structure comprising:
    position adjusting means for adjusting a position of said trigger switch unit with respect to said casing, said trigger switch unit being adjustable between a plurality of mounting positions, said operating member being operable to actuate said trigger switch at each of said mounting positions.

2. The data symbol reader according to claim 1, wherein said supporting structure movably supports said trigger switch unit, and
    wherein said position adjusting means further comprises:
    guide means for restricting a direction of movement of said trigger switch unit.

3. The data symbol reader according to claim 1, further comprising:

setting means for setting a position of said operating member with respect to said casing in a stepwise manner.

4. The data symbol reader according to claim 3, wherein said trigger switch unit has an engaging concave depression formed therein to facilitate movement of said trigger switch unit.

5. The data symbol reader according to claim 1, further comprising:

dustproofing means for preventing the entry of particulate matter into said casing, said dustproofing means being provided at a periphery of said trigger switch unit.

6. A data symbol reader, comprising:

a data symbol reading means for reading a data symbol;

a casing enclosing said data symbol reading means;

a longitudinal slot formed in said casing;

a guide parallel to said longitudinal slot; and an operation member for actuating said data symbol reading means, said operation member being movable between a plurality of mounting positions within said longitudinal slot along said guide, and said operation member being operable to actuate said data symbol reading means at each of said mounting positions.

7. The data symbol reader according to claim 6, wherein said casing has a first end and a second end opposite to said first end, a head part of said casing extending from said second end, and said longitudinal slot extending parallel to a drection extending from said first end to said second end of said casing.

8. The data symbol reader according to claim 6, further comprising:

a setting device for setting a position of said operation member along said longitudinal slot.

9. The data symbol reader according to claim 8, wherein said setting device includes a detent mechanism for defining stepwise positions of said operation member along said longitudinal slot.

10. The data symbol reader according to claim 9, wherein said detent mechanism includes:

V-shaped teeth formed in said casing parallel to said longitudinal slot; and a resilient member having an angular protrusion for engaging said V-shaped teeth, said resilient member being movable with said operation member.

11. The data symbol reader according to claim 6, wherein said operation member is supported by a base movable along said longitudinal slot and larger than said longitudinal slot, and said base closing entry to said casing via said longitudinal slot at all positions of said base along said longitudinal slot.

12. The data symbol reader according to claim 6, wherein said operation member is supported by a base movable along said longitudinal slot, and wherein said base has a concave engaging depression formed therein, said base being movable along said longitudinal slot by a pin-like member.

13. The data symbol reader according to claim 6, wherein said operation member actuates a switch electrically connected to said data symbol reading means, said switch being provided along said longitudinal slot.

14. The data symbol reader according to claim 13, wherein said operation member and said switch are supported by a base movable along said longitudinal slot, and said operation member and said switch are movable together along said longitudinal slot.

* * * * *